Oct. 19, 1926.

R. L. KING, SR 1,604,052

LEVEL

Filed May 19, 1924    2 Sheets-Sheet 1

Rupert L. King Sr.,
INVENTOR

BY Victor J. Evans
ATTORNEY

WITNESS: Gerald Hennely

Oct. 19, 1926.
R. L. KING, SR
1,604,052
LEVEL
Filed May 19, 1924    2 Sheets-Sheet 2
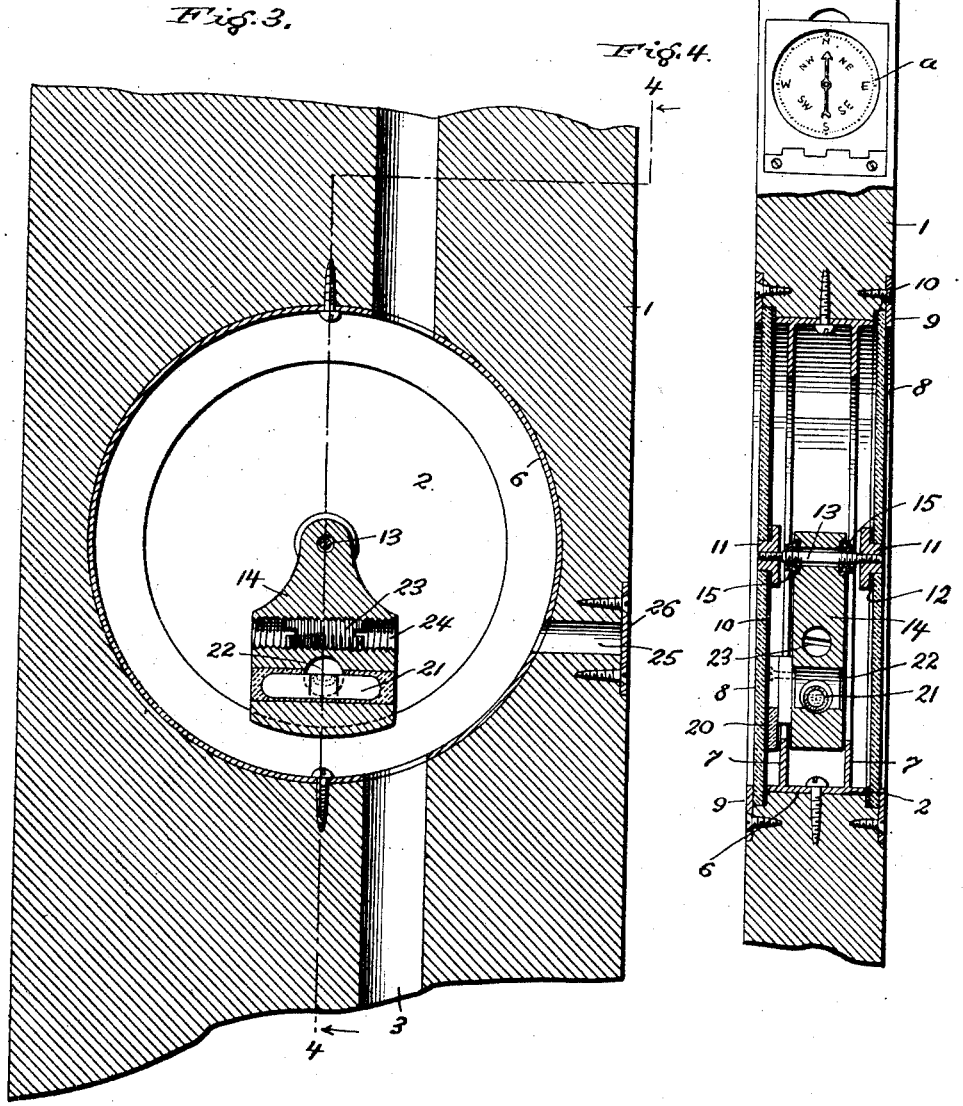
Rupert L. King Sr.,
INVENTOR
BY Victor J. Evans
ATTORNEY
WITNESS:

Patented Oct. 19, 1926.

1,604,052

UNITED STATES PATENT OFFICE.

RUPERT L. KING, SR., OF WILMINGTON, NORTH CAROLINA.

LEVEL.

Application filed May 19, 1924. Serial No. 714,452.

This invention relates to a level of the pendulum type, the principal object of the invention being to provide an instrument by means of which one can tell at a glance the inclination of an object or grade without calculations as to the angles.

Another object of the invention is to provide the pendulum with a bubble glass and a counter-balance weight so that the position of the pendulum may be rectified or verified and adjusted to its true position when out of adjustment.

A further object of the invention is to provide a pair of flanges or rings between which the pendulum works and which are provided with scales on their front faces which cooperate with marks on the pendulum for giving the readings.

A further object of the invention is to so arrange the scales that the instrument need not be placed in a certain position to secure the readings, thus enabling the instrument to be put in place very easily and quickly.

A still further object of the invention is to provide means whereby the device can be used as a transit.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 3 is an enlarged sectional view through portion of the device.

Figure 4 is a section on line 4—4 of Figure 3.

Figure 1:
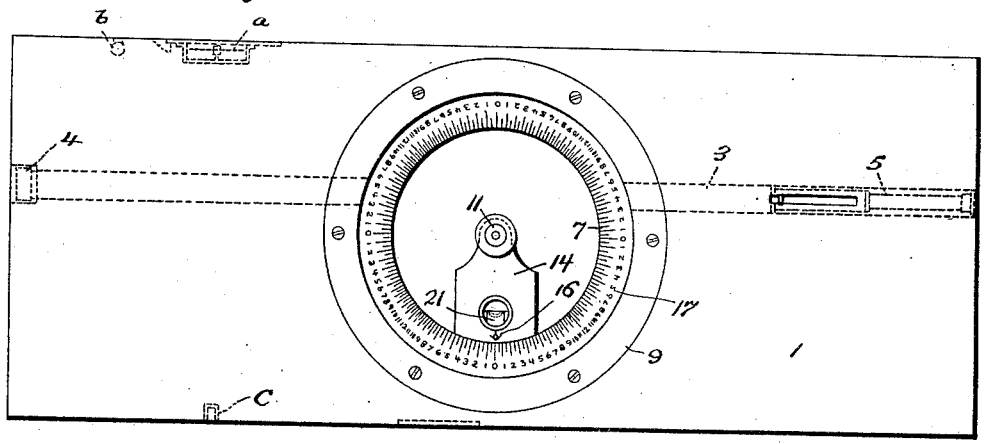
Figure 1 is an elevation of the complete device.
Figure 2:
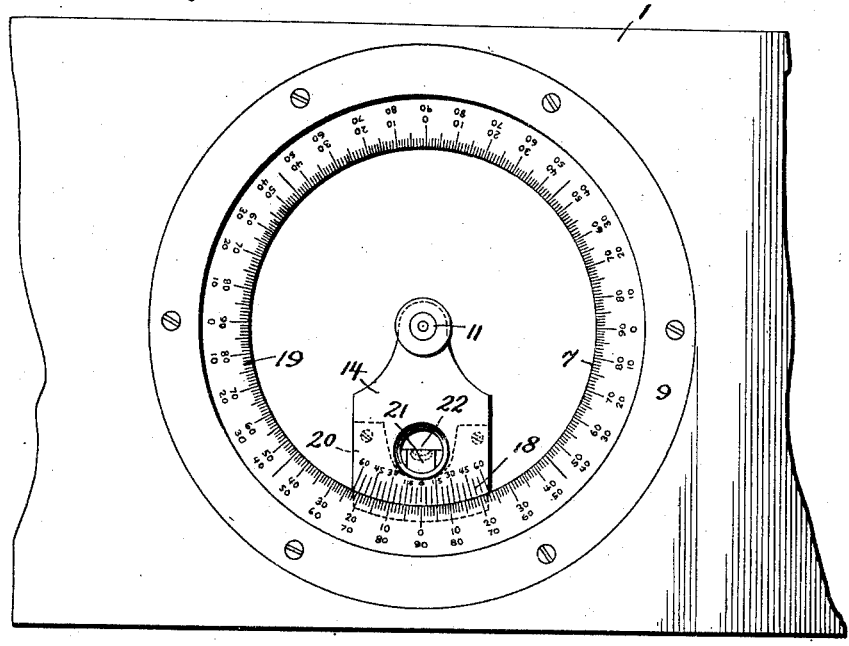
Figure 2 is an enlarged view of a portion of the opposite side of the device.

In these views, 1 indicates the stock or level bar which is provided with a central transverse opening 2 and a longitudinally extending hole 3 which intersects the opening 2. This opening 3 has a lens 4 adjacent one end and a telescopic device 5 adjacent its other end so that the device can be used as a transit for ascertaining grades and the like. In order to facilitate adjustment of the device when it is being used as a transit I place a compass $a$ and a bubble glass $b$ in one edge of the stock and I also form a socket $c$ in the other edge of the device under the compass. This socket is to receive a pin or projection on a supporting member such as a tripod or the like.

A ring member 6 is placed in the opening 2 and this member is provided with a pair of flanges 7 which extend inwardly and are parallel to each other. The ends of the opening 2 are enlarged to receive the edges of the transparent plates 8 which cover the opening and which are held in place by the rings 9, resilient strips 10 being placed under the edges of the plates to form a dust proof connection and also to absorb shocks and thus prevent damage to the parts. Nuts 11 are carried by the transparent plates at their centers, resilient washers 12 being placed between the flanges of the nuts and said plates to make a tight fit and absorb shocks. A shaft 13 has its reduced screw threaded ends engaging the nuts so that the shaft is supported by the plates within the chamber formed by the opening and a pendulum 14 is rotatably supported within the chamber by said shaft, anti-friction bearings 15 being provided for the pendulum. The pendulum has its outer part arranged to operate in the space between the two flanges and one side of the pendulum is provided with a mark 16 which cooperates with a scale 17 on the outer face of one of the flanges 7 and the other side of the pendulum is provided with a vernier 18 which cooperates with a scale 19 on the outer face of the flange 7. I place a magnifying glass 20 on this side of the pendulum to permit the vernier to be easily read.

I prefer to arrange the scale 19 in quadrants, each quadrant being graduated in degrees and each quadrant being doubly indexed and reading from zero to 90 degrees in both directions. The scale 17 is also divided into quadrants, each quadrant being graduated in inches and fractions thereof and each quadrant reading from zero to 12 and from 12 to zero as shown in Figure 1. This arrangement of the scales will permit the device to be picked up and placed on the object without stopping to see that a certain edge is uppermost.

The pendulum carries a bubble glass 21 of usual construction which is read through the opening 22 formed in the pendulum and the pendulum also carries a counter-balance weight 23 which is formed in the shape of a double ended screw adjustable in a threaded hole 24 made in the pendulum. A hole 25 is formed in the stock in such a manner that a screw driver or the like can be placed through the same to adjust the counter-balance weight 23 when the device is held in a certain position so that it is not necessary to disassemble the parts to adjust the counter-balance weights. The hole 25 is covered by a plate 26 which is screwed to the stock.

From the foregoing it will be seen that by placing the stock upon an object or grade the inclination of which is to be ascertained, the pendulum will swing under the action of gravity, upon its shaft, while its longitudinal center would be in a true vertical plane and the degree of inclination can be ascertained from the marks on the pendulum and the scales on the flanges. The position of the pendulum can be verified by the bubble glass. This device will enable one to ascertain at a glance the inclination of an object without calculations and without positioning the device as to its top and bottom. The vernier is graduated directly on the pendulum so that there is no danger of its being misplaced or twisted out of its proper position. The pendulum can be adjusted very easily by a screw driver or the like by passing the same through the opening 25 and the magnifying glass enables one with poor vision to easily make the readings.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the class described comprising a stock having an opening therein, transparent members covering the ends of the hole and forming a chamber, a ring connected with the walls of the hole and having a pair of inwardly extending flanges, which are spaced apart, the outer faces of the flanges having scales thereon, a shaft, bearings therefor supported by the transparent members, a pendulum suspended from the shaft and having its outer end operating in the space between the flanges, the faces of the pendulum having marks thereon, a bubble glass carried by the pendulum, an adjustable weight carried by the pendulum, said stock having a hole therein for permitting the weight to be adjusted by a tool and a magnifying glass carried by the pendulum, and covering some of the marks thereon.

In testimony whereof I affix my signature.

RUPERT L. KING, Sr.